(12) United States Patent
Mizutani (10) Patent No.: US 7,615,902 B2
(45) Date of Patent: Nov. 10, 2009

(54) MOTOR HAVING BREATHING HOLE (75) Inventor: Nobuo Mizutani, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 335 days.

(21) Appl. No.: 11/806,324

(22) Filed: May 31, 2007

(65) Prior Publication Data
US 2007/0295160 A1 Dec. 27, 2007

(30) Foreign Application Priority Data
Jun. 6, 2006 (JP) ............................. 2006-157389

(51) Int. Cl.
*H02K 5/10* (2006.01)
*H02K 7/116* (2006.01)

(52) U.S. Cl. .................. 310/88; 310/75 R; 310/89; 74/606 R (58) Field of Classification Search .............. 310/75 R, 310/83, 85, 88, 89; 74/606 R
See application file for complete search history.

(56) References Cited

U.S. PATENT DOCUMENTS

| 3,308,681 | A | * | 3/1967 | Huber | 74/606 R |
| 4,544,166 | A | * | 10/1985 | Karasawa | 310/88 |
| 4,893,039 | A | * | 1/1990 | Isii | 310/89 |
| 5,650,677 | A | * | 7/1997 | Furukawa et al. | 310/88 |
| 6,014,915 | A | * | 1/2000 | Evans | 74/606 R |
| 2005/0166557 | A1 | * | 8/2005 | Ramajois et al. | 55/385.3 |
| 2005/0184606 | A1 | * | 8/2005 | Kokubu et al. | 310/75 R |

FOREIGN PATENT DOCUMENTS

| DE | 37-16912 | | 12/1988 |
| DE | 196-35180 | | 3/1998 |
| EP | 417344 | A1 * | 3/1991 |
| EP | 522183 | A1 * | 1/1993 |
| FR | 2760577 | A1 * | 9/1998 |
| JP | 2003-230245 | A * | 8/2003 |

* cited by examiner

*Primary Examiner*—Burton Mullins
(74) *Attorney, Agent, or Firm*—Posz Law Group, PLC (57) ABSTRACT

A motor includes: a motor element with a rotation shaft; a speed reduction element having a rotation speed reduction device for reducing a rotation speed and a gear housing for accommodating the reduction device; and a water proof sheet. The gear housing includes: an accommodation portion having a communication passage and an accommodation concavity; and a cover having a breathing hole. The breathing hole has a cover side opening, which connects to an accommodation side opening of the communication passage. An inside of the motor element is connected to an outside of the gear housing through the breathing hole and the communication passage. The cover seals an opening of the accommodation concavity. The water proof sheet having water proof property and gas permeability is disposed between the accommodation side opening and the cover side opening.

10 Claims, 3 Drawing Sheets

MOTOR HAVING BREATHING HOLE

CROSS REFERENCE TO RELATED APPLICATION

This application is based on Japanese Patent Application No. 2006-157389 filed on Jun. 6, 2006, the disclosure of which is incorporated herein by reference.

FIELD OF THE INVENTION

The present invention relates to a motor having a breathing hole.

BACKGROUND OF THE INVENTION

A conventional motor includes a breathing hole as a through hole for compensating pressure difference between an inside and an outside of the motor. For example, the motor includes a motor portion having a rotation shaft with a rotation axis and a speed reduction portion having a speed reduction means for reducing rotation speed of the rotation shaft. The motor portion and the speed reduction portion are connected to each other. The speed reduction means is accommodated in a gear housing, which includes a through hole for communicating between the inside and the outside of the motor. Preferably, the motor having this breathing hole has water proof construction in order to protect the motor from the water to penetrate into the motor through the breathing hole.

The water proof construction is disclosed in, for example, German patent application publication No. 3716912. In this motor, a positioning concavity for positioning a water proof sheet is formed on the surface of the gear housing. Further, the breathing hole extends from a center portion of the positioning concavity to the inside of the gear housing. The water proof sheet is arranged on the bottom of the positioning concavity. Then, a seal member is arranged on a periphery portion of the water proof sheet. After that, a pressure application member having elasticity is inserted into the positioning concavity. Thus, the water proof sheet is fixed on an opening of the breathing hole, which is disposed on an outer side of the motor, so that the water proof sheet prevents the water from penetrating into the motor.

However, when the water proof sheet is fixed to the breathing hole, the seal member as a sealing means and the pressure application member as a fixation means are additionally necessary. Thus, the number of parts of the motor becomes larger. Accordingly, a manufacturing process of the motor becomes complicated, and productivity of the motor is reduced.

It is required for the motor to form the water proof construction for the breathing hole without increasing the number of parts of the motor.

SUMMARY OF THE INVENTION

In view of the above-described problem, it is an object of the present disclosure to provide a motor having a breathing hole.

According to a first aspect of the present disclosure, a motor includes: a motor element including a rotation shaft; a speed reduction element including a rotation speed reduction device and a gear housing, wherein the rotation speed reduction device reduces a rotation speed of the rotation shaft, wherein the gear housing accommodates the rotation speed reduction device, and wherein the speed reduction element is coupled with the motor element; and a water proof sheet. The gear housing includes an accommodation portion and a cover. The accommodation portion includes a communication passage and an accommodation concavity. The communication passage is coupled with an inside of the motor element. The communication passage has an accommodation side opening. The accommodation concavity accommodates the rotation speed reduction device. The cover includes a breathing hole. The breathing hole has a cover side opening connecting to the accommodation side opening. The breathing hole couples between the communication passage and an outside of the gear housing. The cover seals an opening of the accommodation concavity. The water proof sheet is disposed between the accommodation side opening and the cover side opening. The water proof sheet has water proof property and gas permeability.

In the above motor, even if water is introduced into the breathing hole, the water is prevented from penetrating into the communication passage by the water proof sheet. Further, since the water proof sheet is disposed between the accommodation side opening and the cover side opening, the water proof sheet is fixed in the motor without adding an additional part for fixing the water proof sheet. Thus, the number of parts in the motor is reduced.

According to a second aspect of the present disclosure, a motor includes: a motor element including a rotation shaft; a speed reduction element including a worm gear and a gear housing, wherein the worm gear reduces a rotation speed of the rotation shaft, wherein the gear housing accommodates the worm gear, and wherein the motor element is mounted on the speed reduction element; and a water proof sheet. The gear housing includes a cover, an accommodation concavity and a communication passage. The accommodation concavity accommodates the worm gear. The cover covers an opening of the accommodation concavity. The communication passage is coupled with an inside of the motor element. The communication passage has an accommodation side opening. The cover includes a breathing hole with a cover side opening. The breathing hole couples between the communication passage and an outside of the gear housing. The water proof sheet is disposed between the accommodation side opening and the cover side opening so that the cover side opening couples with the accommodation side opening. The water proof sheet has water proof property and gas permeability. The breathing hole has a central axis, which is perpendicular to an rotation axis of the rotation shaft. The communication passage has a central axis, which is perpendicular to the central axis of the breathing hole.

In the above motor, even if water is introduced into the breathing hole, the water is prevented from penetrating into the communication passage by the water proof sheet. Further, since the water proof sheet is disposed between the accommodation side opening and the cover side opening, the water proof sheet is fixed in the motor without adding an additional part for fixing the water proof sheet. Thus, the number of parts in the motor is reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
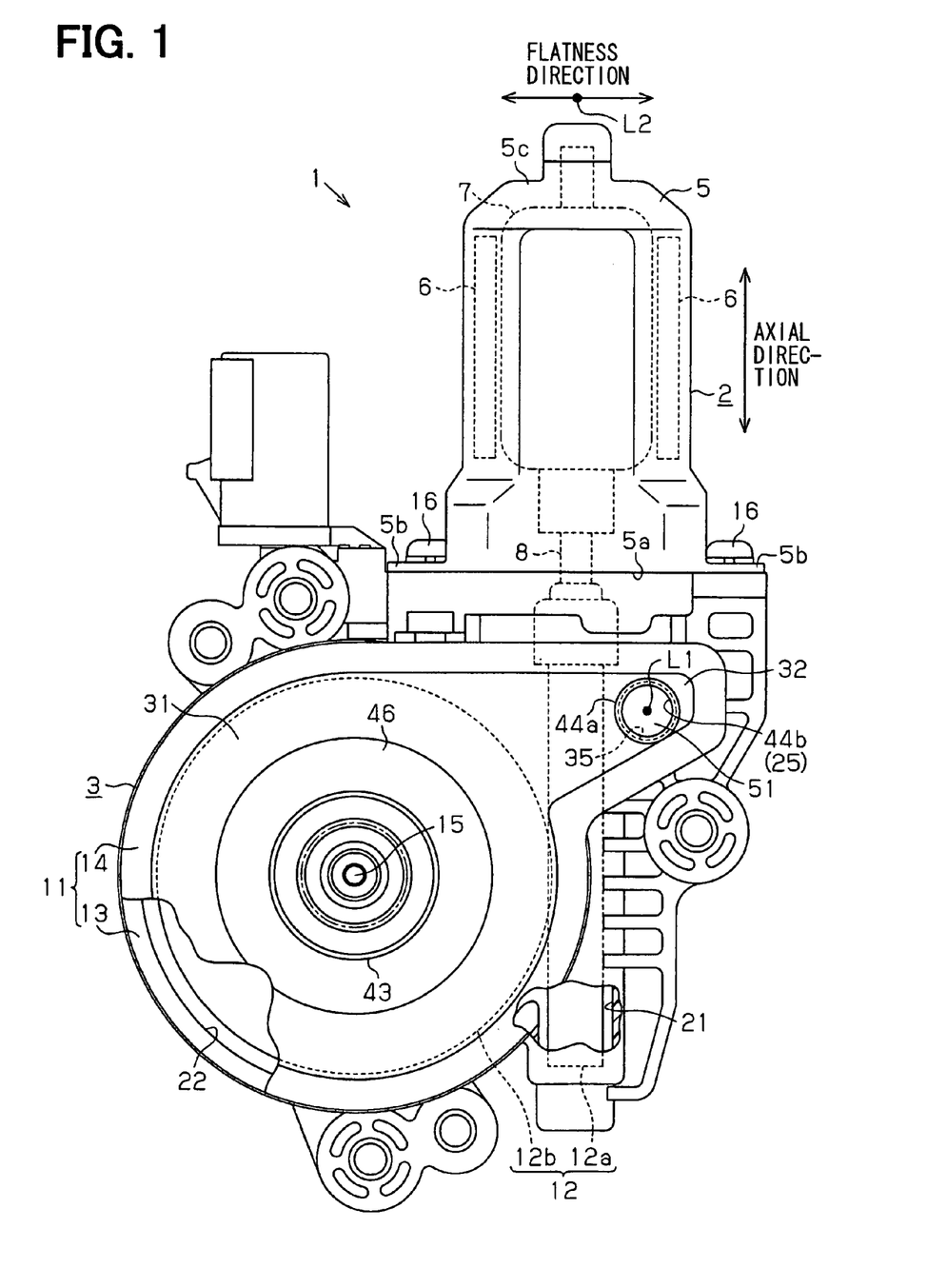
FIG. 1 is a schematic view showing a motor.

FIG. 1 shows a motor 1 according to an example embodiment of the present disclosure. The motor 1 is suitably used for a driving power source of a power window in a vehicle. The motor 1 is disposed between an outer panel and an inner panel, which provide a vehicular door. The motor 1 operates a regulator for opening and closing (i.e., moving up and down) a door window glass. The motor is a geared motor so that a motor portion 2 and a speed reduction portion 3 are integrally assembled in the motor 1. The speed reduction portion 3 reduces rotation speed of the motor portion 2 and outputs rotation of the motor portion 2.

The motor portion 2 includes a yoke housing 5, which is made of magnetic and metallic material. The yoke housing 5 has a cylindrical shape with a bottom. The opening 5a of the yoke housing 5 contacts an extending portion 5b, which extends toward the outside in a radial direction. A pair of magnets 6 is bonded to the inner surface of the yoke housing 5 in such a manner that the magnets face each other. A motor side bearing (not shown) is formed at the center of the bottom 5c of the yoke housing 5. An armature 7 having a rotation shaft 8 with a rotation axis is formed inside of the magnets 6. One end of the rotation shaft 8 is supported with the motor side bearing. The top of the rotation shaft 8 protrudes from the opening 5a of the yoke housing 5 into the speed reduction portion 3. The motor portion 2 has an oval shape when seen along with the axis of the rotation shaft 8.

The gear housing 11 providing the speed reduction portion 3 includes a gear accommodation portion 13 and a cover 14. The gear accommodation portion 13 accommodates a worm gear 12 as a speed reduction means. The cover 14 engages with the gear accommodation portion 13.

The gear accommodation portion 13 made of synthetic resin includes a shaft accommodation concavity 21 and a wheel accommodation concavity 22. The shaft accommodation concavity 21 accommodates a worm shaft 12a to coincide with the axis of the rotation shaft 8. The wheel accommodation portion 22 accommodates a worm wheel 12b having a disk shape. The worm wheel 12b and the worm shaft 12a provide the worm gear 12. The rotation shaft 8 and the worm shaft 12a are connected to each other through a backstop clutch, for example. The clutch transmits the rotation of the rotation shaft 8 to the worm shaft 12a, and does not transmit the rotation of the worm shaft 12a to the rotation shaft 8.

The shaft accommodation concavity 21 extends along with the axis of the worm shaft 12a in order to accommodate the worm shaft 12a. The shaft accommodation concavity 21 communicates with a space in the yoke housing 5 from a periphery of the motor portion side. The wheel accommodation concavity 22 has a shape corresponding to the worm wheel 12b. The shape of the wheel accommodation concavity 22 has a circular shape when seen along with a thickness direction of the gear accommodation portion 13, which is equal to the axis of an output shaft 15. The wheel accommodation portion 22 is connected to the shaft accommodation concavity 21 almost at the center of the shaft accommodation concavity 21 in a longitudinal direction (i.e., a longer side direction). The worm shaft 12a in the shaft accommodation concavity 21 and the worm wheel 12b in the wheel accommodation concavity 22 are engaged with each other at a connection portion between the shaft accommodation concavity 21 and the wheel accommodation concavity 22. The output shaft 15 is rotatably integrated with the worm wheel 12b at the center of the worm wheel 12b in the radial direction in such a manner that the output shaft 15 is coaxially with the worm wheel 12b.

The yoke housing 5 is fixed to the gear accommodation portion 13 by screwing a screw 16 into the gear accommodation portion 13 from the extending portion side of the yoke housing 5 so that the top of the rotation shaft 8 and the end of the worm shaft 12a are engaged. Thus, the motor portion 2 is mounted on the gear housing 11 by using the screw 16.

Figure 4:
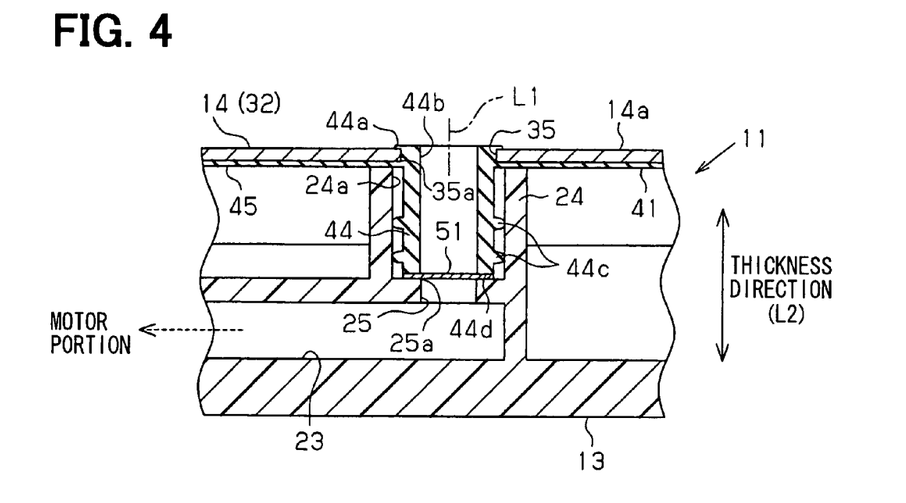
FIG. 4 is a partial cross sectional view showing a part of a gear housing in the motor.

The gear accommodation portion 13 includes a communication passage 23, which is disposed in the shaft accommodation concavity 21 and opposite to the wheel accommodation portion 22, as shown in FIG. 4. The communication passage 23 extends along with the longitudinal direction of the shaft accommodation concavity 21. The one end of the communication passage 23 disposed on the motor portion side opens toward the inside of the motor portion 2. Specifically, the one end of the communication passage 23 opens toward the inside of the yoke housing 5. The communication passage 23 extends to a predetermined position on the motor portion side beyond the center portion of the shaft accommodation portion 21 in the longitudinal direction. The communication passage 23 is connected to the inside of the motor 2 at the one end thereof. An introduction cylinder portion 24 is formed on the other end of the communication passage 23 disposed on a side opposite to the motor 2. The introduction cylinder portion 24 has a cylinder shape when seen along with the axis of the rotation shaft 8. The introduction cylinder portion 24 extends along with a latitudinal direction (i.e., shorter side direction) L2 of the motor portion 2. An introduction hole 24a is formed at the center of the introduction cylinder portion 24. The introduction hole 24a and the communication passage 23 are connected to each other through the communication hole 25. The opening of the communication hole 25 disposed outside of the communication passage 23 provides an accommodation side opening 25a.

Figure 2A:
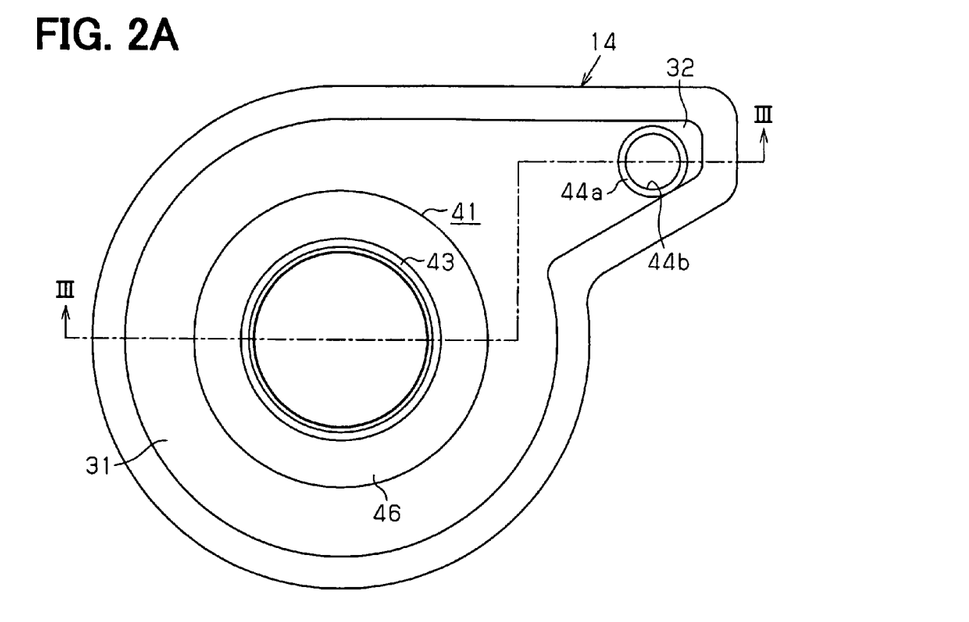
FIG. 2A is a plan view showing a cover of the motor.
Figure 2B:
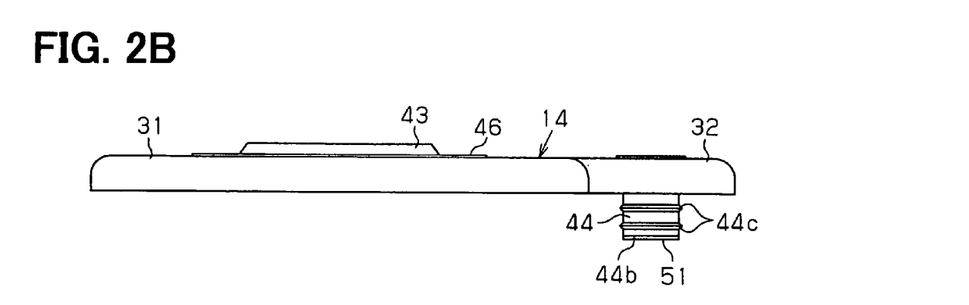
FIG. 2B is a side view showing the cover.

As shown in FIG. 1, the cover 14 is made of, for example, metal. The cover 14 has a plate shape so that the cover 14 covers the openings of the wheel accommodation concavity 22 and the shaft accommodation concavity 21, which are formed in the gear accommodation portion 13. Specifically, as shown in FIGS. 2A and 2B, the cover 14 includes a close portion 31 having a circular shape when seen along with the thickness direction and a ventilation portion 32 having a trapezoid shape. The ventilation portion 32 protrudes from the close portion 31 toward the outside in the radial direction. The periphery of the cover 14 is integrated with a sidewall 33 so as to protrude toward the gear accommodation portion 13.

Figure 3:
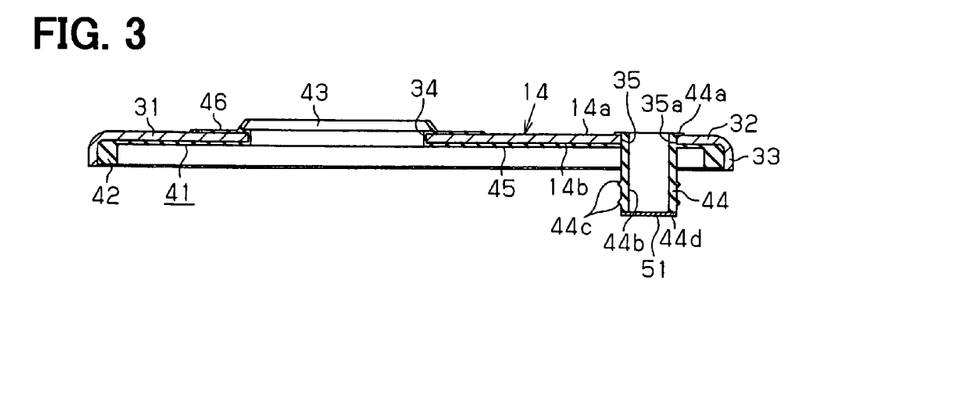
FIG. 3 is a cross sectional view showing the cover taken along line III-III in FIG. 1.

The close portion 31 is formed to have a circular shape corresponding to the opening of the wheel accommodation concavity 22. As shown in FIG. 3, an output hole 34, through which the output shaft 15 penetrates, is formed at the center portion of the close portion 31 in the radial direction. The output hole 34 is formed to have a diameter slightly larger than the output shaft 15.

The breathing hole 35 penetrates the ventilation portion 32 in the thickness direction thereof, and is formed almost at the center of the ventilation portion 32. The breathing hole 35 is disposed at a predetermined position such that the center of the breathing hole 35 coincides with the center of the introduction hole 24a and the center of the communication hole 25 when seen along with the axis of the output shaft 15 in a case where the cover 14 is mounted on the gear accommodation portion 13. The center axis L1 of the breathing hole 35 coincides with the latitudinal direction L2 of the motor portion 2 when seen along with the axis of the rotation shaft 8 in a case where the cover 14 is assembled in the gear accommodation portion 13. The center axis L1 provides a line perpendicular to a sheet of the drawing of FIG. 1. The latitudinal direction L2 of the motor portion 2 also provides the line perpendicular to the sheet of the drawing of FIG. 1. As shown in FIG. 4, the breathing hole 35 is formed to have a diameter slightly smaller than the introduction hole 24a in the gear accommodation portion 13. The inner opening of the breathing hole 35 provides a cover side opening 35a.

A composite elastic member 41 is integrally formed in the cover 14. The composite elastic member 41 is made of elastomer having elasticity. The composite elastic member 41 includes an engagement seal member 42, an output seal member 43, a breathing portion 44 and a connection member 45. The engagement seal member 42 is formed on an inner surface of the sidewall 33. The output seal member 43 is formed along with the periphery of the output hole 34. The breathing portion 44 is formed to protrude from the breathing hole 35 into the inside of the cover 14. The engagement seal member 42, the output seal member 43 and the breathing portion 44 are coupled with the connection member 45.

The engagement seal member 42 functions as a sealing means, and is formed along with the inner surface of the sidewall 33. Further, the cross section of the engagement seal member 42 is almost a square shape, the cross section taken along a direction perpendicular to the longitudinal direction. The output seal member 43 is arranged on the periphery of the output hole 34 and on the outside surface 14a of the cover 14. The output seal member 43 has a ring shape. The inner diameter of the output seal member 43 becomes smaller as it goes from the bottom disposed on the cover side to the top of the member 43. Further, the inner diameter of the top of the output seal member 43 is substantially equal to the diameter of the output hole 34.

The breathing portion 44 as an elastic member has a cylindrical shape with an outer diameter equal to the diameter of the breathing hole 35. In FIG. 4, the breathing portion 44 extends along with the center axis L1 of the breathing hole 35. One end of the breathing portion 44, which is disposed on a cover side, is inserted into the breathing hole 35. Further, the one end of the breathing portion 44 contacts the inner surface of the breathing hole 35. A clamp portion 44a is integrally formed on the one end of the breathing portion 44. The clamp portion 44a extends toward the outside in the radial direction, and disposed on the outer surface 14a of the cover 14. The clamp portion 44a is formed to be sufficiently thin compared with the thickness of the cover 14. Further, the clamp portion 44a prevents the breathing portion 44 from falling off the cover 14 when the clamp portion 44a is assembled.

A length of the breathing portion 44 from the inner surface 14b of the cover 14 to the top of the breathing portion 44 is equal to or slightly longer than the length of the introduction cylinder portion 24 in the axial direction. A ventilation hole 44b is formed on the center of the breathing portion 44 to penetrate the breathing portion 44 in the axial direction. The ventilation hole 44b has a diameter, which is equal to the communication hole 25 of the gear accommodation portion 13. The outer surface of the breathing portion 44 on the top portion thereof protrudes to the outside in the radial direction, and includes multiple press fit portions 44c having a ring shape. In this embodiment, two press fit portions 44c are formed on the outer surface of the breathing portion 44, and separated from each other in the axial direction. The height of each press fit portion 44c in the radial direction is slightly larger than a difference of a radius between the introduction hole 24a and the breathing hole 35.

Further, a water proof sheet 51 is welded to the top surface 44d of the breathing portion 44. The water proof sheet 51 has a circular shape with a diameter equal to the outer diameter of the top surface 44d of the breathing portion 44. The water proof sheet 51 allows gas to pass therethrough and prohibits water to pass therethrough. Thus, the water proof sheet 51 has gas permeability and water proof property. The water proof sheet 51 is made of, for example, PTFE (i.e., poly tetra fluoro-ethylene).

As shown in FIG. 3, the connection member 45 has a thin film shape for covering a whole inner surface 14b except for the sidewall 33 of the cover 14 and a whole inner surface of the output hole 34. The connection member 45 is integrated with the engagement seal portion 42, the output seal portion 43 and the breathing portion 44, respectively, so that the engagement seal portion 42, the output seal portion 43 and the breathing portion 44 are integrated and connect to each other. Further, a clamp portion 46 is integrally formed on a part of the connection member 45 connecting to the base end of the output seal portion 43. The clamp portion 46 extends from the base end of the output seal portion 43 toward the outside in the radial direction along with the outer surface 14a of the cover 14.

The composite elastic member 41 is formed integrally with the cover 14 in such a manner that elastomer material is filled in a forming die (not shown) for forming the composite elastic member 41 after the cover 14 is mounted in the forming die, and then, the elastomer material is cooled and solidified. By performing this, all parts of the composite elastic member 41 such as the engagement seal portion 42, the output seal portion 43, the breathing portion 44, the connection portion 45 and the clamp portions 44a, 46 are formed.

When the cover 14 integrated with the composite elastic member 41 is engaged with the gear accommodation portion 13, as shown in FIG. 1, the cover 14 is arranged appropriately with reference to the gear accommodation portion 13 so that the opening of the shaft accommodation concavity 21 and the opening of the wheel accommodation concavity 22 are sealed with the close portion 31. At the same time, as shown in FIG. 4, the cover 14 is engaged with the gear accommodation portion 13 in such a manner that the breathing portion 44 formed in the ventilation portion 32 of the cover 14 is press-inserted into the introduction hole 24a of the introduction cylinder portion 24 formed in the gear accommodation portion 13. The engagement seal portion 42 is adhered to the periphery of the opening of the shaft accommodation concavity 21 and the periphery of the opening of the wheel accommodation concavity 22, so that an interface between the cover 14 and the periphery of the opening of the shaft accommodation concavity 21 is sealed, and an interface between the cover 14 and the periphery of the opening of the wheel accommodation concavity 22 is sealed. Further, the top of the output shaft 15 protrudes from the center portion of the close portion 31 toward the outside of the gear housing 11. The output seal portion 43 is adhered to the outer circumference of the output shaft 15, so that an interface between the outer circumference of the output shaft 15 and the output hole 34 of the cover 14 is sealed with the output seal portion 43.

At this time, the breathing portion 44 is press-inserted into the introduction cylinder portion 24 until the top surface of the introduction cylinder portion 24 contacts the connection member 45 of the composite elastic member 41, which covers the inner surface of the cover 14. Thus, the breathing portion 44 and the water proof sheet 51 are arranged between the accommodation side opening 25a and the cover side opening 35a. When the top surface of the introduction cylinder portion 24 contacts the connection portion 45, the length of the breathing portion 44 in the axial direction is equal to or slightly longer than the length of the introduction cylinder portion 24 in the axial direction. Accordingly, the breathing portion 44 is accommodated in the introduction cylinder portion 24 such that the breathing portion 44 is compressed in the axial direction and elastically deformed. Thus, the breathing portion 44 presses the water proof sheet 51 toward a periphery of the accommodation side opening 25a in the gear accommodation portion 13, the water proof sheet 51 being adhered to the top surface 44d of the breathing portion 44. Thus, water does not penetrate in the gear housing 11 from an interface between the top surface 44d of the breathing portion and the water proof sheet 51.

The breathing portion 44 is to be press-inserted into the introduction cylinder portion 24, and two press fit portions 44c having the ring shape are formed on the outer circumference of the breathing portion 44. Accordingly, when the breathing portion 44 is inserted into the introduction cylinder portion 24, the press fit portion 44c seals a clearance between the introduction cylinder portion 24 and the breathing portion 44.

The motor 1 as a driving power source of the power window device is arranged in the door panel such that the latitudinal direction L2 of the motor portion 2, i.e., the thickness direction of the motor 1 when seen along with the axial direction of the rotation shaft 8, coincides with the thickness direction of the door panel (not shown) of the vehicle. Thus, the breathing hole 35 is formed in the cover 14 such that the latitudinal direction L2 of the motor portion 2 when seen along with the axial direction of the rotation shaft 8 coincides with the center axis L1. The breathing hole 35 opens on the outside surface 14a of the cover 14 toward an outer panel (not shown) or an inner panel (not shown) providing the door panel.

When current is supplied to the armature 7 of the motor 1 from an external power source, the armature 7 starts to rotate. This rotation is transmitted from the rotation shaft 8 to the worm shaft 12a. Then, the rotation speed is reduced by the worm shaft 12a and the worm wheel 12b, and the rotation is outputted from the output shaft 15. The rotation of the output shaft 15 provides to operate the window regulator (not shown) for opening and closing the door window glass.

For example, when the motor portion 2 generates heat by driving the motor portion 2, the space in the yoke housing 5 and the outside of the motor 1 are coupled with the communication passage 23, the communication hole 25, and the ventilation hole 44b or the breathing hole 35. Accordingly, the pressure difference between the inside of the motor 1 and the outside of the motor 1 is reduced. Further, since the breathing portion 44 providing the cover 14 together with the water proof sheet 51 are disposed between the accommodation side opening 25a of the communication hole 25 and the cover side opening 35a of the breathing hole 35, the water penetrating into the ventilation hole 44b is prevented from penetrating into the motor 1 through the communication hole 25 and the communication passage 23 by the water proof sheet 51.

Thus, the above motor 1 has the following effects.

Since the water proof sheet 51 is disposed between the accommodation side opening 25a formed in the gear accommodation portion 13 and the cover side opening 35a formed in the cover 14, the water is prevented from penetrating into the communication passage 23 by the water proof sheet 51 even when the water is introduced to the breathing hole 35 or the communication hole 44. Accordingly, the water is prevented from penetrating into the motor 1. The water proof sheet 51 is disposed between the accommodation side opening 25a formed in the gear accommodation portion 13 and the cover side opening 35a formed in the cover 14, specifically, between the accommodation side opening 25a and the breathing portion providing the cover 14. It is not necessary to add a new element for fixing the water proof sheet 51. Thus, the number of parts in the motor 1 is not substantially increased even when the water proof sheet 51 is formed in the motor 1.

The breathing portion 44 formed in the cover side opening 35a pressurizes toward the periphery of the accommodation side opening 25a in the gear accommodation portion 13. Accordingly, the water proof sheet 51 disposed between the cover side opening 35a and the accommodation side opening 25a is pressed by the breathing portion 44 toward the accommodation side opening. Thus, holding force of the water proof sheet 51 is improved. The water is surely prevented from penetrating into the motor 1 from an interface between the cover side opening 35a and the water proof sheet 51, so that the water proof property is improved.

The breathing portion 44 is integrally formed with the cover 14. When the cover 14 is assembled with the gear accommodation portion 13, the breathing portion 44 is also assembled at the same time. Thus, since the breathing portion 44 is easily assembled, assembling performance of the motor 1 is improved, and further, productivity of the motor 1 is also improved.

Since the water proof sheet 51 is adhered to the top surface 44d of the breathing portion 44, the water is surely prevented from penetrating into the motor from the interface between the breathing portion 44 and the water proof sheet 51. Accordingly, the water proof property is much improved. Further, the water proof sheet 51 is assembled together with assembling the breathing portion 44. Thus, the assembling performance is improved.

The breathing portion 44 is integrated with the engagement seal portion 42, the output seal portion 43 and the like, the engagement seal portion 42 sealing between the gear accommodation portion 13 and the cover 14, and the output seal portion 43 sealing between the output shaft 15 and the cover 14. Thus, when the engagement seal portion 42 and the output seal portion 43 are formed, at the same time, the breathing portion 44 is formed. Further, since the breathing portion 44, the engagement seal portion 42, the output seal portion 43 and the like are integrated with each other, the number of parts of the motor 1 is reduced. Accordingly, the productivity of the motor 1 is improved, compared with a case where the breathing portion 44, the engagement seal portion 42 and the like are independently formed.

The breathing hole 35 to be formed in the cover 14 has the center axis L1, which coincides with the latitudinal direction L2 of the motor portion 2 when seen along with the axis of the rotation shaft 8. In general, when the motor 1 is used for the driving power source of the power window device of the vehicle, the motor 1 is arranged such that the thickness direction of the door panel coincides with the latitudinal direction of the motor 1. Accordingly, when the center axis L1 of the breathing hole 35 coincides with the latitudinal direction L2 of the motor portion 2 when seen along with the axis of the rotation shaft 8, i.e., the thickness direction of the motor 1, the opening of the breathing hole 35 does not direct upward in a case where the motor 1 is arranged in the door panel. Thus, the water is prevented from penetrating into the breathing hole 35, i.e., the ventilation hole 44d. Accordingly, the water is much surely prevented from penetrating into the motor 1.

Since the press fit portion 44c is formed on the outer circumference of the breathing portion 44, for example, a contact area between the breathing portion 44 and the introduction cylinder portion 24 becomes small, compared with a case where an interface between the breathing portion 44 and the introduction cylinder portion 24 is sealed by contacting the whole outer circumference of the breathing portion 44 to the inner surface of the introduction cylinder portion 24. Thus, the breathing portion 44 is easily press-inserted into the introduction cylinder portion 24.

The water proof sheet 51 is adhered to the top surface 44d of the breathing portion 44. For example, when the water proof sheet 51 is welded to the periphery of the accommodation side opening 25a in the gear accommodation portion 13, the welding process may be performed in the introduction cylinder portion 24. Accordingly, a jig for welding is limited, and further, it is difficult to perform the welding process. Here, before the cover 14 is assembled in the gear accommodation portion 13, the breathing portion 44 is formed to protrude from the ventilation portion 32. There is no element for providing the cover 14 around the periphery of the top end of the breathing portion 44. Accordingly, the welding process of the water proof sheet 51 is easily performed, compared with a case where the water proof sheet 51 is welded to the periphery of the accommodation side opening 25a of the gear accommodation portion 13.

The water proof construction of the motor 1 is simple such that the water proof sheet 51 is disposed between the accommodation side opening 25a and the cover side opening 35a. Here, assuming a water proof construction such that the breathing hole is connected to a pipe so that water is prevented from penetrating into the motor, the motor is arranged such that the water does not penetrate from the opening of the pipe. Accordingly, the arrangement of the motor is limited. Further, since the pipe protrudes from the gear housing toward the outside of the motor, the dimensions of the motor may be increased. However, the motor 1 shown in FIG. 1 has the simple water proof construction such that the water proof sheet 51 is disposed between the accommodation side opening 25a and the cover side opening 35a. Thus, the dimensions of the motor 1 are minimized.

Although the center axis L1 of the breathing hole 35 coincides with the latitudinal direction L2 of the motor portion 2 when seen along with the axis direction of the rotation shaft 8, the breathing hole 35 may be formed on another portion of the cover 14 as long as the breathing hole 35 is coupled with the communication passage 23.

Alternatively, the breathing portion 44 may be independently formed from the engagement seal portion 42 and the output seal portion 43. In this case, as long as the water proof sheet 51 is disposed between the accommodation side opening 25a and the cover side opening 35a, the water proof sheet 51 may be disposed on any end of the breathing portion 44 having two ends. Thus, the breathing portion 44 is a different member from the engagement seal portion 42 and the output seal portion 43.

Although the water proof sheet 51 is welded to the top surface 44d of the breathing portion 44, the water proof sheet 51 may be bonded to the top surface 44d with an adhesion member.

Figure 5:
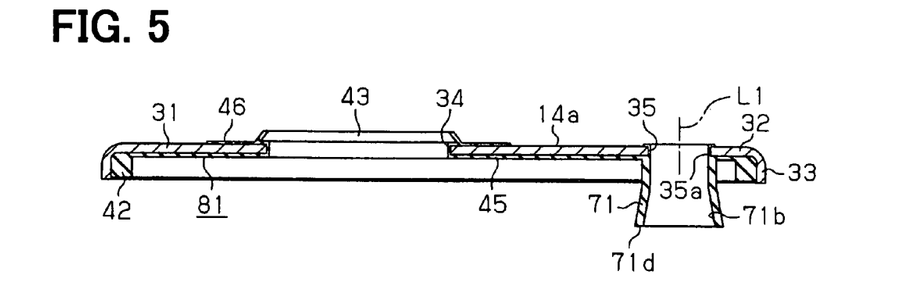
FIG. 5 is a cross sectional view showing another cover in the motor.
Figure 6:
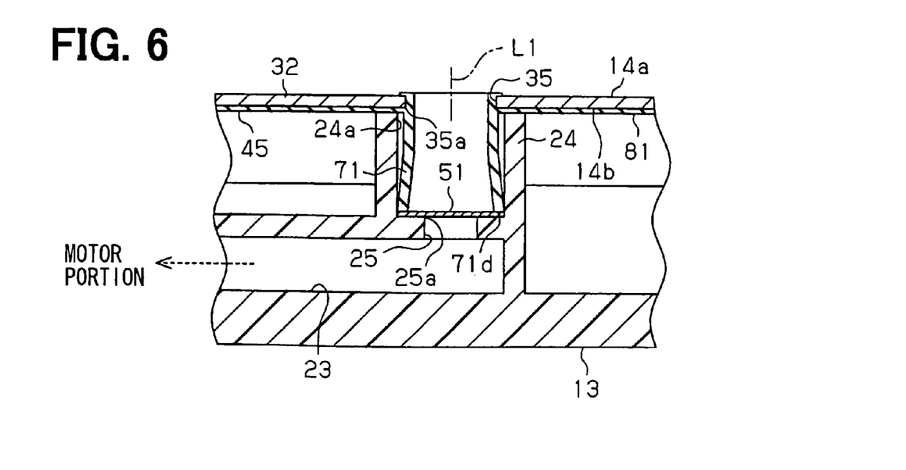
FIG. 6 is a partial cross sectional view showing a part of another gear housing in the motor.

Alternatively, the breathing portion 44 may be another breathing portion 71 shown in FIG. 5. The breathing portion 71 includes the cover 14. The breathing portion 71 is integrated with the engagement seal portion 42, the output seal portion 43 and the connection portion 45 so that they provide a composite elastic member 81. The breathing portion 71 has a cylindrical shape, and extends along with the center axis L1 of the breathing hole 35 from the periphery of the cover side opening 35a of the breathing hole 35. A part of the breathing portion 71, which is disposed on a base end side from the center portion in the axis direction of the breathing portion 71, has an inner diameter equal to the diameter of the breathing hole 35. Further, the part of the breathing portion 71 on the top end side from the center in the axial direction has the outer diameter and the inner diameter, each of which becomes larger as it goes to the top of the breathing portion 71. As shown in FIG. 6, the outer diameter of the top of the breathing portion 71 is equal to or slightly larger than the diameter of the introduction hole 24a. The inner diameter of the top of the breathing portion 71 is larger than the diameter of the communication hole 25. The inner circumference of the breathing portion 71 provides a ventilation hole 71b. Further, the length of the breathing portion 71 from the inner surface 14b of the cover 14 to the top of the breathing portion 71 is equal to or slightly longer than the length of the introduction cylinder portion 24 in the axial direction.

In a case where the cover 14 having the breathing portion 71 is engaged with the gear accommodation portion 13, the cover 14 is arranged with reference to the gear accommodation portion 13 so that the opening of the shaft accommodation concavity 21 and the opening of the wheel accommodation concavity 22 are sealed with the close portion 31 after the water proof sheet 51 is arranged on the accommodation side opening 25a. Then, the cover 14 is engaged with the gear accommodation portion 13 so that the breathing portion 71 is press-inserted into the introduction hole 24a of the introduction cylinder portion 24. At this time, the breathing portion 71 is press-inserted into the introduction cylinder portion 24 until the top surface of the introduction cylinder portion 24 contacts the connection portion 45 of the composite elastic member 81, which covers the inner surface of the cover 14. Thus, the breathing portion 44 and the water proof sheet 51 are arranged between the accommodation side opening 25a and the cover side opening 35a. When the top surface of the introduction cylinder portion 24 contacts the connection portion 45, the breathing portion 71 is accommodated in the introduction cylinder portion 24 under a condition that the breathing portion 71 is compressed in the axial direction and deformed elastically since the length of the breathing portion in the axial direction is equal to or slightly longer than the length of the introduction cylinder portion 24 in the axial direction. Therefore, the breathing portion 71 presses the water proof sheet 51 toward the periphery of the accommodation side opening 25a in the gear accommodation portion 13. Thus, the water proof sheet 51 is sandwiched between the breathing portion 71 and the periphery of the accommodation side opening 25a in the gear accommodation portion 13, so that the holding performance of the water proof sheet 51 is improved. In this case, the water is prevented from penetrating into the gear housing 11 from the interface between the top surface 71d of the breathing portion 71 and the water proof sheet 51. Since the top of the breathing portion 71 is equal to or slightly larger than the diameter of the introduction hole 24a, the top of the breathing portion 71 seals between the breathing portion 71 and the introduction cylinder portion 24. In this case, it is not necessary to add a new element for fixing the water proof sheet 51. Thus, the number of parts in the motor 1 is not substantially increased even when the water proof sheet 51 is formed in the motor 1.

Alternatively, the water proof sheet 51 may not be welded to the top surface 44d of the breathing portion 44. In this case, after the water proof sheet 51 is arranged on the accommodation side opening 25a, the cover 14 is engaged with the gear accommodation portion 13 so that the breathing portion 44 is press-inserted into the introduction hole 24a of the introduction cylinder portion 24. Here, the water proof sheet 51 is sandwiched between the top surface 44d of the breathing portion 44 and the periphery of the accommodation side opening 25a of the gear accommodation portion 13.

Although the breathing portion 44 is formed in the cover 14, the breathing portion 44 may be formed in the gear accommodation portion 13. In this case, the breathing portion 44 is formed to have a cylindrical shape extending from the communication hole 25 or the periphery of the accommodation side opening 25a toward the cover side opening 35a. Thus, the water proof sheet 51 is arranged between the top surface (i.e., the end on the cover side) of the breathing portion 44 and the periphery of the cover side opening 35a of the cover 14. In this case, the water proof sheet 51 may be adhered to the top surface of the breathing portion 44. Alternatively, the water proof sheet 51 may be sandwiched between the top surface of the breathing portion 44 and the periphery of the cover side opening 35a of the cover 14. Further, the breathing portion 44 may be formed on both side of the gear accommodation portion 13 and the cover 14. In this case, one of the breathing portions 44 formed in the gear accommodation portion 13 has a cylindrical shape extending from the periphery of the accommodation side opening 25a or the communication hole 25 to the cover side opening 35a. The other one of the breathing portions 44 formed in the cover 14 has a cylindrical shape extending from the breathing hole 35 or the periphery of the cover side opening 35a to the accommodation side opening 25a. The water proof sheet 51 is disposed between the top surfaces of two breathing portions 44. Here, when the cover 14 is assembled in the gear accommodation portion 13, the one of the breathing portions 44 formed in the gear accommodation portion 13 presses the water proof sheet 51 toward the cover side opening side. The other one of the breathing portions formed in the cover 14 presses the water proof sheet 51 toward the accommodation side opening side. Thus, the water is surely prevented from penetrating into the motor 1 from an interface between the cover side opening 35a and the water proof sheet 51, so that the water proof property is improved. Further, since the breathing portions 44 is easily assembled, assembling performance of the motor 1 is improved, and further, productivity of the motor 1 is also improved.

Although the introduction cylinder portion 24 is formed in the gear accommodation portion 13, the gear accommodation portion 13 may not have the introduction cylinder portion. Although the breathing portion 44 as the elastic member is formed in the cover 14, the cover 14 may not have the breathing portion. In this case, the water proof sheet 51 may be directly disposed between the accommodation side opening 25a and the cover side opening 35a under a condition that at least one of the communication hole 25 and the breathing hole 35 is extended. Thus, the water proof sheet 51 is arranged without increasing an additional part for fixing the water proof sheet 51. The number of parts in the motor 1 is not substantially increased, so that the water proof construction of the breathing hole 35 is formed.

Although the cover 14 is made of metal, the cover 14 may be made of synthetic resin.

Although the motor 1 is used for the driving power source for the power window, the motor 1 may be used for a driving power source for another device.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A motor comprising:
a motor element including a rotation shaft;
a speed reduction element including a rotation speed reduction device and a gear housing, wherein the rotation speed reduction device reduces a rotation speed of the rotation shaft, wherein the gear housing accommodates the rotation speed reduction device, and wherein the speed reduction element is coupled with the motor element; and
a water proof sheet, wherein
the gear housing includes an accommodation portion and a cover,
the accommodation portion includes a communication passage and an accommodation concavity,
the communication passage is coupled with an inside of the motor element,
the communication passage has an accommodation side opening,
the accommodation concavity accommodates the rotation speed reduction device,
the cover includes a breathing hole,
the breathing hole has a cover side opening connecting to the accommodation side opening,
the breathing hole couples between the communication passage and an outside of the gear housing,
the cover seals an opening of the accommodation concavity,
the water proof sheet is disposed between the accommodation side opening and the cover side opening, and
the water proof sheet has water proof property and gas permeability.

2. The motor according to claim 1, further comprising:
an elastic member disposed on a periphery of one of the accommodation side opening and the cover side opening, wherein
the elastic member pressurizes a periphery of the other one of the accommodation side opening and the cover side opening.

3. The motor according to claim 2, wherein
the elastic member is integrated with the cover.

4. The motor according to claim 2, wherein
the water proof sheet is adhered to a periphery of the elastic member.

5. The motor according to claim 2, wherein
the elastic member is disposed on the cover, and
the water proof sheet is sandwiched between the elastic member and the periphery of the accommodation side opening of the accommodation portion.

6. The motor according to claim 2, wherein
an interface between the accommodation portion and the cover is sealed with a sealing member, and
the elastic member is integrated with the sealing member.

7. The motor according to claim 1, wherein
the motor element has a longer side and a shorter side when seen along with an axial direction of the rotation shaft, and
the breathing hole has a central axis, which is parallel to the shorter side of the motor element.

8. The motor according to claim 1, wherein
the water proof sheet is made of poly tetra fluoro-ethylene.

9. A motor comprising:
a motor element including a rotation shaft;

a speed reduction element including a worm gear and a gear housing, wherein the worm gear reduces a rotation speed of the rotation shaft, wherein the gear housing accommodates the worm gear, and wherein the motor element is mounted on the speed reduction element; and a water proof sheet, wherein the gear housing includes a cover, an accommodation concavity and a communication passage, the accommodation concavity accommodates the worm gear, the cover covers an opening of the accommodation concavity, the communication passage is coupled with an inside of the motor element, the communication passage has an accommodation side opening, the cover includes a breathing hole with a cover side opening, the breathing hole couples between the communication passage and an outside of the gear housing, the water proof sheet is disposed between the accommodation side opening and the cover side opening so that the cover side opening couples with the accommodation side opening, the water proof sheet has water proof property and gas permeability, the breathing hole has a central axis, which is perpendicular to an rotation axis of the rotation shaft, and the communication passage has a central axis, which is perpendicular to the central axis of the breathing hole.

10. The motor according to claim 9, wherein the motor is a driving power source for a power window in a vehicle, the motor is disposed between an outer panel and an inner panel, which provide a vehicular door, the motor element has a longer side and a shorter side when seen along with the rotation axis of the rotation shaft, the central axis of the breathing hole is parallel to the shorter side of the motor element, and the shorter side of the motor element is parallel to a thickness direction of the vehicular door.

* * * * *